Aug. 20, 1940.  C. F. LARZELERE  2,212,294
ARTIFICIAL BAIT
Filed May 31, 1939
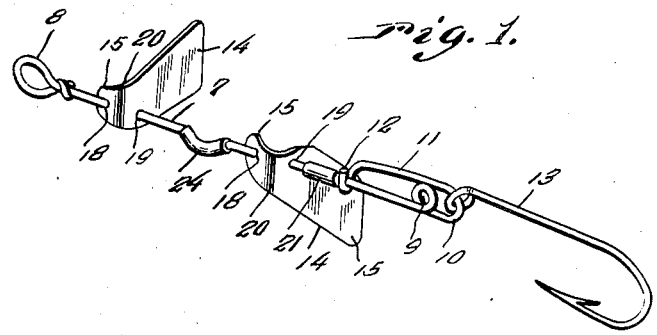
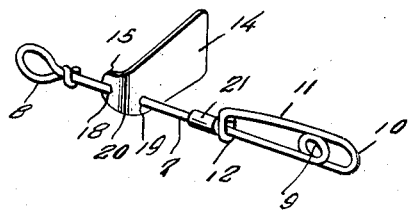
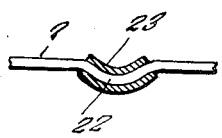
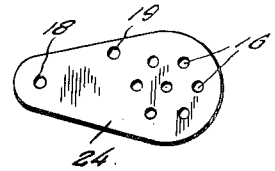
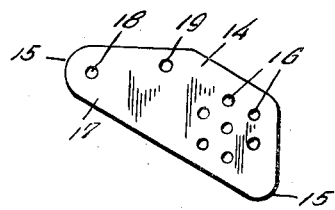
Inventor
C. F. Larzelere
By Clarence A. O'Brien
and Hyman Berman
Attorneys Patented Aug. 20, 1940

2,212,294

UNITED STATES PATENT OFFICE 2,212,294

ARTIFICIAL BAIT

Charles F. Larzelere, Wild Rose, Wis., assignor of one-half to Delbert F. Patterson, Wild Rose, Wis.

Application May 31, 1939, Serial No. 276,723

2 Claims. (Cl. 43—42)

The present invention relates to angler's and fisherman's tackle and equipment and pertains particularly to a novel spinner such as is used by fly rod anglers.

Artificial bait such as spoon hooks, spinners and the like are used for trolling and casting. There are diversified styles and forms on the market and heretofore patented. So far as I have been able to ascertain, the particular construction and arrangement herein depicted and described, is possessed of certain structural refinements and improvements calculated to be more aptly fitted to insure more positive efficiency and effective luring and landing of the catch.

The principal feature of the invention pertains to one or more especially desiged and rotatably mounted spinner blades, each blade being so shaped and rotatably anchored on its mounting rod as to promote the desired deception and resistance sufficient for propulsion or rotation of said blades.

Another feature of the invention has to do with a spring snap catch to removably accommodate the fish hook.

Other features and advantages will become more readily apparent from the following description and the accompanying illustrative drawing.

In the drawing, showing the preferred embodiments of the invention, and wherein like numerals are employed to designate corresponding parts throughout the views:

Figure 1 is a perspective view of the duplex or dual style spinner and constructed in accordance with the principles of this invention.

Figure 2 is a perspective view of the single or individual spinner type.

Figure 3 is a fragmentary view showing what may be called a spacing and stop sleeve.

Figures 4 and 5 are top plan views of the spinners per se in flat form to show the preferred outlines and configurations followed in their construction.

Figure 6 is a top plan or edge view showing the obtuse-acute angularity of the spinner blade in relation to the longitudinal dimension of the rod carrying it.

In both forms of the invention depicted in Figures 1 and 2, it will be observed that the numeral 7 designates a rod of appropriate dimensions and length. At one end this is fashioned into an eye 8 to accommodate the fishing line (not shown). The opposite end is bent into a spring coil as at 9 and then formed into a return bend at 10 to define a limb 11 extending substantially parallel to the main rod. The limb terminates in a hook 12 engaged with the rod to provide a spring clasp for the fishing hook 13. This clasp feature contributes its proportionate share to the combined utility of the unitary assemblage in a manner hereinafter fully explained. The spinner blades are individually denoted by the numerals 14. They are of duplicate construction so far as outline or configuration is concerned. It will be observed in Figure 4, for example, that the preferred embodiment is substantially trapeziform having somewhat rounded corners 15. In Figure 4, which is somewhat of a modification, I provide a multiplicity of apertures 16 in the blade proper. Thus, this portion may be either imperforate or perforate as desired.

The attaching tang or shank portion 17 has a hole 18 and a second companion hole 19. The latter is close to the marginal edge and may be said to be off-set in relation to the median or longitudinal dimension of the unit as a whole. Thus, when this attaching tank is bent upon itself as at 20 it properly mounts the blade and disposes it at the desired angularity with respect to the supporting rod 7. This is brought out in Figure 6 from which it will be observed that the blade on one side is at an obtuse angle and on the other side at an acute angle. This disposition provides for rapid spinning or rotation of the blade unit 14 on the rod 7. There is an abutment sleeve 21 adjacent the clasp and cooperating with one of the spinners shown in Figure 1. Where two spinners are employed it is desirable to separate the same and thus the rod is bent as at 22 and surrounded by a metal sleeve 23 having a corresponding curvature. This sleeve serves as a two-way abutment and separator for the two spinners.

In some instances, instead of using the trapezium-like configuration for the spinner unit 14 in Figure 4, a substantially egg-shaped or somewhat ovate spinner 24 may be employed as a modification. This is provided with the afore-mentioned holes 18 and 19 for bending and mounting and is also provided with apertures 16 to diminish resistance and to lighten the blade to expedite spinning.

I desire to emphasize the importance of the afore-mentioned loop-like clasp. Not only does the coil 9 serve as a spring to place the limb 11 and hook 12 under tension to function somewhat as a safety pin, but it also performs as a stop or abutment. That is to say, the eye of the hook is lodged in the crotch portion of the loop between the bend or bight of the loop and the coil 9.

Hence the primary object of this terminal loop 10 is to prevent hooks having the turned-down eye (as shown in the drawing in Figure 1) or a turn-up eye, from sliding up the wire and getting caught so as to stand out at a right angle to the longitudinal median line of the elongated loop. As before stated, this spinner is used principally by fly rod anglers, who attach their turn-down or turn-up eye equipped flies to the so-called clasp or snap fastener. So far as it known, this coil equipped loop-style clasp is an innovation in this particular line of endeavor. Hence the importance of the loop is stressed as it maintains the hook 13 in what is believed to be the correct position.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. An artificial bait of the class described comprising a longitudinally elongated bendable wire rod member having means at one end for attachment of a fishing line, the opposite end being bent upon itself to form a coiled spring and then formed with a return bend extending inwardly and beyond the coiled spring to define a longitudinally elongated loop, the terminal of the free limb of said loop having quick separable engagement with the body portion of the rod, said coiled spring being adjacent the return bend to define between itself and said bend a seat for accommodation of either a turn-down or turn-up eye equipped hook.

2. In a spinner of the class described comprising a rod having hook accommodation means and line accommodation means and an abutment on the rod adjacent the hook accommodation means, a longitudinally spaced abutment sleeve on the intermediate portion of the rod, said sleeve being of such extent and bent with the enclosed rod to hold said sleeve stationary with respect to said rod, whereby a spinner mounted between the two abutments and a second spinner mounted on the rod between the last named abutment and line attaching means will not obstruct movement of each other.

CHARLES F. LARZELERE.